US007478822B1

(12) United States Patent
Harer

(10) Patent No.: US 7,478,822 B1
(45) Date of Patent: Jan. 20, 2009

(54) STEERING GEAR PINION BEARING ASSEMBLY FOR USE IN A RACK AND PINION STEERING APPARATUS

(75) Inventor: Dennis F. Harer, Kingsport, TN (US)

(73) Assignee: TRW Automotive U.S. LLC, Livonia, MI (US)

( * ) Notice: Subject to any disclaimer, the term of this patent is extended or adjusted under 35 U.S.C. 154(b) by 233 days.

(21) Appl. No.: 11/409,400

(22) Filed: Apr. 21, 2006

(51) Int. Cl.
*B62D 53/06* (2006.01)

(52) U.S. Cl. ........................ 280/428; 280/427; 280/444

(58) Field of Classification Search ................. 280/428, 280/444, 443, 427
See application file for complete search history.

(56) References Cited

U.S. PATENT DOCUMENTS 4,531,603 A * 7/1985 VanCise, Jr. ................ 180/428
4,655,092 A * 4/1987 Taig ...................... 73/862.338
6,035,957 A * 3/2000 Place ......................... 180/426
6,206,574 B1 * 3/2001 Sonoda et al. .............. 384/507
6,591,706 B2 * 7/2003 Harer et al. ................... 74/422
6,619,420 B1 * 9/2003 Saarinen ..................... 180/428
6,681,885 B2 1/2004 Harer
7,037,231 B2 * 5/2006 Showalter ................... 475/222
7,216,737 B2 * 5/2007 Sugiyama ................... 181/108
2005/0199082 A1 * 9/2005 Slave et al. ................... 74/422

* cited by examiner

*Primary Examiner*—Paul N Dickson
*Assistant Examiner*—Tashiana Adams
(74) *Attorney, Agent, or Firm*—MacMillan, Sobanski & Todd, LLC

(57) ABSTRACT

A steering gear pinion bearing assembly adapted to support a pinion in a rack and pinion steering apparatus comprises a pinion support member including a first end, a second end and a stepped body portion; and a bearing assembly carried by the pinion support member, the bearing assembly including at least a plurality of bearings and an outer race.

20 Claims, 4 Drawing Sheets

300 302 304 306 308 310 312 312A 314 316 318 318A 320 320 322 324 X 360 360 362 364 366 366A 366B 366C 368 368A 370 372 374 376 378 380

316
300
324
314
310
318
302
X 320
308
318A
306
320
312
312A
322
304
359
356A
330
358
344
346A
340
348
338
X1

350
332
336
352
346
342
354
342A
334
356

380
374
370
360
372
376
360
378
366C
366B
366A
366
364
368
368A
362

STEERING GEAR PINION BEARING ASSEMBLY FOR USE IN A RACK AND PINION STEERING APPARATUS

BACKGROUND OF THE INVENTION

This invention relates in general to a rack and pinion steering apparatus and in particular to a steering gear pinion bearing assembly for supporting a pinion in such a rack and pinion steering apparatus.

A rack and pinion steering apparatus has a housing containing a rack and a pinion. The rack has a longitudinally extending row of rack teeth in meshing engagement with helical gear teeth on the pinion. The opposite ends of the rack bar project outward from the housing and are connected with a steering linkage and a corresponding pair of steerable vehicle wheels. The pinion is connected with the vehicle steering wheel by an input shaft and a torsion bar. When a steering maneuver is being performed the pinion rotates and the rack bar moves longitudinally.

SUMMARY OF THE INVENTION

This invention relates to a steering gear pinion bearing assembly for supporting a pinion in a rack and pinion steering apparatus. The steering gear pinion bearing assembly comprises a pinion support member including a first end, a second end and a stepped body portion; and a bearing assembly carried by the pinion support member, the bearing assembly including at least a plurality of bearings and an outer race.

Other advantages of this invention will become apparent to those skilled in the art from the following detailed description of the invention, when read in light of the accompanying drawings.

DETAILED DESCRIPTION OF THE INVENTION

Figure 1:
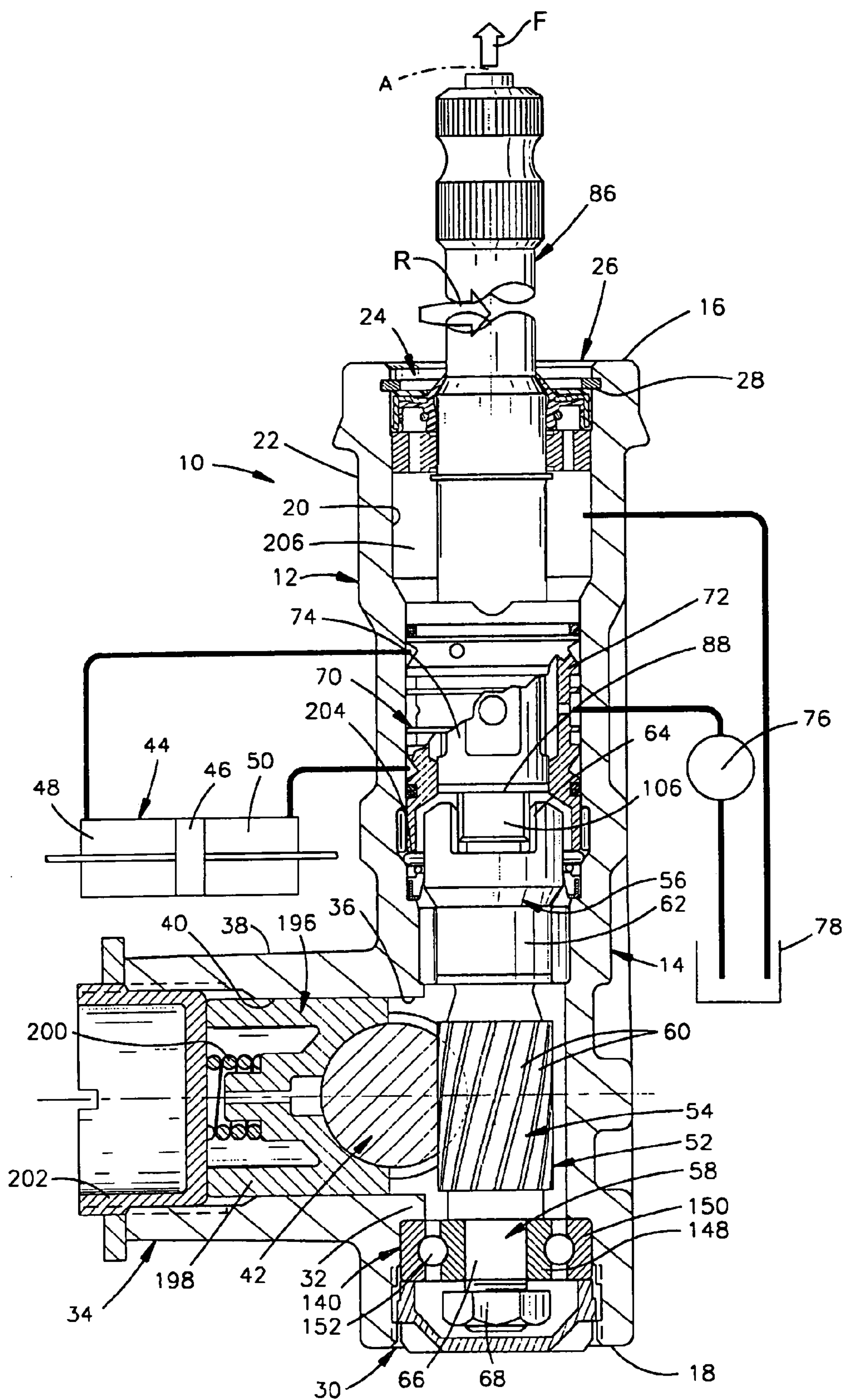
FIG. 1 is a sectional view of a portion of a prior art rack and pinion steering apparatus.

Referring now to prior art FIG. 1, there is illustrated a portion of a hydraulically assisted rack and pinion steering apparatus, indicated generally at 10. The general structure and operation of the prior art rack and pinion steering apparatus 10 is conventional in the art and prior art FIG. 1 is taken from U.S. Pat. No. 6,681,885 to Harer, the disclosure of this patent herein incorporated by reference in entirety. Thus, only those portions of the prior art rack and pinion steering apparatus 10 which are necessary for a full understanding of this invention will be explained and illustrated. Although this invention will be described and illustrated in connection with the particular kind of rack and pinion steering apparatus disclosed herein, it will be appreciated that this invention may be used in connection with other kinds of rack and pinion steering apparatuses if so desired. For example, while the prior art power assisted steering apparatus 10 described below is a hydraulically assisted power steering apparatus, the steering apparatus could also be an electronically controlled power steering apparatus.

As shown in prior art FIG. 1, the prior art steering apparatus 10 includes a housing 12. The housing 12 includes a first tubular portion 14 that extends axially along axis A. The first tubular portion 14 of the housing 12 has first and second axial ends 16 and 18, respectively, and cylindrical inner and outer surfaces 20 and 22, respectively. The inner surface 20 of the first tubular portion 14 of the housing 12 defines a passage 24 that extends axially through the first tubular portion 14.

A first opening 26 of the passage 24 is located on the first axial end 16 of the first tubular portion 14 and is defined by the inner surface 20 of the first tubular portion 14 adjacent the first axial end 16. A groove 28 extends into the inner surface 20 of the first tubular portion 14 of the housing 12 adjacent the first axial end 16 of the housing 12. The groove 28 extends around the entire circumference of the inner surface 20 of the first tubular portion 14 of the housing 12.

A second opening 30 of the passage 24 is located at the second axial end 18 of the first tubular portion 14 of the housing 12. The second opening 30 is defined by the inner surface 20 of the first tubular portion 14 adjacent the second axial end 18. A radially inwardly extending, annular wall 32 extends from the inner surface 20 of the first tubular portion 14 near the second axial end 18.

The housing 12 also includes a second tubular portion 34. The second tubular portion 34 of the housing 12 extends perpendicular to the first tubular portion 14 and unites with the first tubular portion near the second axial end 18 of the first tubular portion. The second tubular portion 34 has inner and outer surfaces 36 and 38, respectively. The inner surface 36 defines a yoke bore 40. The yoke bore 40 of the second tubular portion 34 mates with the passage 24 of the first tubular portion 14 near the second axial end 18 of the first tubular portion.

A longitudinally extending rack bar 42 extends through the housing 12 in a direction perpendicular to axis A. The rack bar 42 has a generally circular cross-sectional shape. The rack bar 42 includes a plurality of helical teeth. Opposite end portions (not shown) of the rack bar 42 are connected with the steerable wheels (not shown) of the vehicle (not shown). Linear movement of the rack bar 42 results in the turning of the steerable wheels of the vehicle.

A hydraulic motor 44, shown schematically in FIG. 1, is also formed in the housing 12. The hydraulic motor 44 includes a piston 46, which is attached to the rack bar 42, and two chambers 48 and 50, one on each side of the piston. As hydraulic fluid pressure in one chamber 48 or 50 increases relative to the hydraulic fluid pressure in the other chamber 50 or 48, the piston 46 is moved. Movement of the piston 46 causes linear movement of the rack bar 42.

The illustrated prior art rack and pinion steering gear 10 also includes a pinion assembly 52. The pinion assembly 52 includes a pinion gear 54, a first support portion 56, and a second support portion 58. The pinion gear 54 has a plurality of helical teeth 60 for meshingly engaging the teeth of the rack bar 42.

The first support portion 56 of the pinion assembly 52 forms the first axial end of the pinion assembly. The first support portion 56 includes a cylindrical outer surface 62. An axially extending cavity 64 extends into an end of the first support portion 56. A hole (not shown) extends radially through the first support portion 56 adjacent the cavity 64.

The second support portion 58 of the pinion assembly 52 forms a second axial end of the pinion assembly. The second support portion 58 has a cylindrical outer surface 66. An axial end of the cylindrical outer surface 66 of the first support portion 58 is threaded for receiving a pinion nut 68.

The illustrated prior art rack and pinion steering gear 10 also includes a directional control valve, indicated generally at 70. The directional control valve 70 includes a valve sleeve 72 and a valve core 74. The directional control valve 70 is controlled by rotation of the steering wheel to direct hydraulic fluid to one of the chambers 48 or 50 of the hydraulic motor 44. The hydraulic fluid is supplied to the directional control valve 70 by a pump 76 that draws fluid from a reservoir 78. Also, a pin 204 is provided to fix the valve sleeve 72 to the pinion assembly 52.

The illustrated prior art rack and pinion steering apparatus 10 also includes a torsion bar 106. Only a small portion of the torsion bar 106 is shown in prior art FIG. 1. The torsion bar 106 includes first and second axial ends (not shown). The second axial end is splined. The first axial end of the torsion bar 106 is rotatable relative to the second axial end of the torsion bar which causes the torsion bar 106 to twist.

The illustrated prior art rack and pinion steering gear 10 also includes a bearing 140 and a pinion plug 142. The bearing 140 includes inner and outer races 148 and 150, respectively, and a plurality of balls 152 that are interposed between the inner and outer races. The pinion plug 142 is secured in the second end 18 of the housing 12. To accomplish this, the pinion plug 142 is provided with external threads which are threadably received in internal threads provided in a portion of the second end 18 of the housing 12.

The illustrated prior art rack and pinion steering gear 10 also includes a yoke assembly 196. The yoke assembly 196 includes a yoke bearing 198, a spring 200, and a yoke plug 202. The yoke bearing 198 includes a low friction surface for contacting the rack bar 42.

During operation of the prior art rack and pinion steering apparatus 10, an input shaft 86 is rotated as the vehicle steering wheel is rotated. If the resistance to turning of the steerable wheels is below a predetermined value, rotation of the input shaft 86 will rotate the pinion gear 54 and will move the rack bar 42 to turn the steerable wheels. If the resistance to turning of the steerable wheels is above the predetermined value, the pinion gear 54 will not rotate with the rotation of the input shaft 86. As a result, the torsion bar 106 will twist and the valve core 74 will move relative to the valve sleeve 72. The directional control valve 70 will direct fluid to one of the chambers 48 and 50 of the hydraulic motor 44. As a result, the hydraulic motor 44 assists in moving the rack bar 42 to turn the steerable wheels. As the rack bar 42 moves, the pinion gear 54 rotates and the twisting, or torsion, is removed from the torsion bar 106.

When the pressure of one chamber 48 or 50 of the hydraulic motor 44 increases relative to the other chamber 50 or 48, the piston 46 moves until the pressures within the chambers again equalize. During the movement of the piston 46, the lower pressure chamber decreases in volume. As a result, hydraulic fluid is forced from the chamber. The hydraulic fluid returns to the directional control valve 70 and is then directed to a chamber 206 within the first tubular portion 14 of the housing prior 12 to being returned to the reservoir 80.

Interaction of the helical teeth 60 of the pinion gear 54 and the teeth of the rack bar 42 during rotation of the pinion gear 54 results in a longitudinal force, i.e., into and out of the plane of the paper, for moving the rack bar 42 and an axial force that is directed along axis A. The axial force tends to move the valve assembly in an axial direction relative to the first tubular portion 14 of the housing 12 and relative to the rack bar 42. The direction of the axial force is dependent upon the slope of the helical teeth 60 on the pinion gear 54. In the rack and pinion steering apparatus shown in prior art FIG. 1, rotation of the pinion gear 54 in the counterclockwise direction, shown by the arrow R in FIG. 1, results in an axial force that is directed toward a first axial end of the first tubular portion 14 of the housing 12, shown at arrow F in FIG. 1. The structure and operation of the prior art rack and pinion steering apparatus 10 thus far described is conventional in the art.

Figures 2, 3:
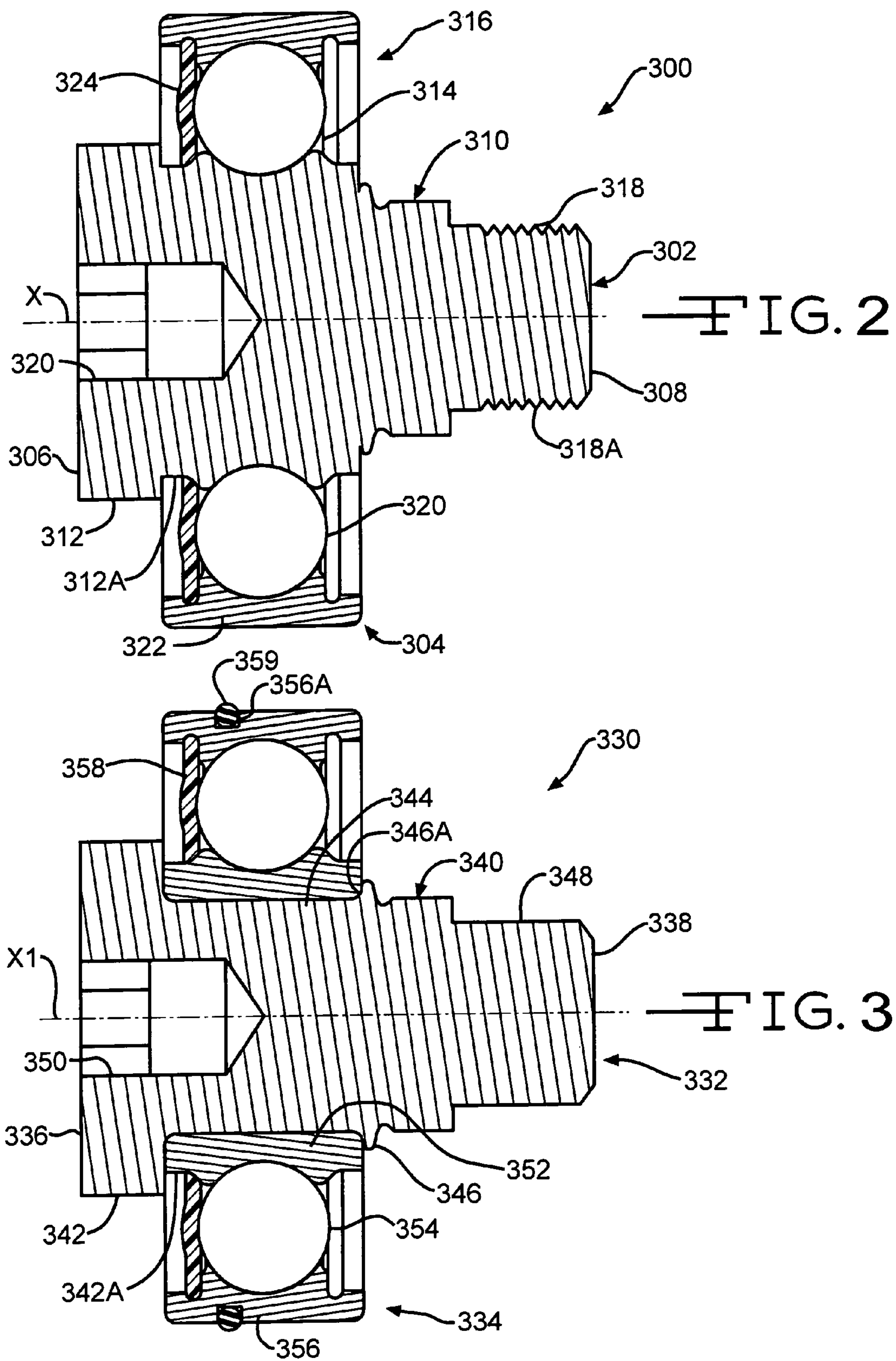
FIG. 2 is a sectional view of a first embodiment of a steering gear pinion bearing assembly.
FIG. 3 is a sectional view of a second embodiment of a steering gear pinion bearing assembly.

Turning now to FIG. 2, there is illustrated a first embodiment of a steering gear pinion bearing assembly, indicated generally at 300. As shown therein, the steering gear pinion bearing assembly 300 includes a first or inner pinion support member 302 and a second or outer member 304. The first member 302 defines an axis X and is formed from a suitable material, such as for example steel, and includes a first or outer end 306, a second or inner end 308 and a stepped body portion 310.

In the illustrated embodiment, the stepped body portion 310 includes an increased diameter first flange 312 adjacent the first end 306, a uniquely shaped intermediate body portion 314, and a reduced diameter portion 318 adjacent the second end 308. As will be discussed below, in the illustrated embodiment, the body portion 314 defines an inner bearing race or bearing journal surface 314A for supporting balls 320 of a bearing assembly 316 and the reduced diameter portion 318 is provided with external threads 318A along a portion thereof. The first member 302 also includes an opening 326 extending from the first end 306 into the body portion 310. In the illustrated embodiment, the opening 326 is a centrally located opening 326 and is in the shape of a female hex socket. Alternatively, the material, construction and/or the shape of the first member 302 may be other than illustrated if so desired.

In the illustrated embodiment, the second member 304 defines a part of the bearing assembly 316 and includes a plurality of balls 320 and an outer bearing race 322. As can be seen in the illustrated embodiment, the balls 320 are disposed between the inner bearing race 314A of the first member 302 and the outer bearing race 322 of the second member 304. The balls 320, the inner bearing race 314A and the outer bearing race 322 cooperate to define the bearing assembly 316. The second member 304 also preferably includes a rubber seal 324 disposed therein on the "exterior" side (left side in FIG. 2) of the bearing assembly 316 to prevent water, dirt or other contaminants from passing through the balls 320 of the bearing assembly 316 and into an interior chamber of a housing of an associated rack and pinion steering apparatus. Alternatively, the construction of the second member 304 may be other than illustrated if so desired. For example, the second member 304 may be constructed from other types of suitable bearings, such as for example, needle bearings and roller bearings may be used. The particular type of bearing which is selected is dependent upon various vehicular design characteristics.

Turning now to FIG. 3 there is illustrated a second embodiment of a steering gear pinion bearing assembly, indicated generally at 330. As shown therein, the steering gear pinion bearing assembly 330 includes a first or inner pinion support member 332 and a second or outer member 334. The first member 332 defines an axis X1 is formed from a suitable material, such as for example steel, and includes a first or outer end 336, a second or inner end 338 and a stepped body portion 340.

In the illustrated embodiment, the stepped body portion 340 includes an increased diameter first flange 342 adjacent the first end 336, an intermediate located outer surface 344, a second increased diameter flange 346, and a reduced diameter portion 348 adjacent the second end 338. The first flange 342 defines a first shoulder 342A and the second flange 346 defines a second shoulder 346A. As will be discussed below, in the illustrated embodiment, the outer surface 344 located between the shoulders 342A and 346A of the flanges 342 and 346, respectively, defines a bearing journal surface and the reduced diameter portion 348 is smooth or non-threaded. The first member 342 also includes an opening 350 extending from the first end 336 into the body portion 340. In the illustrated embodiment, the opening 350 is a centrally located opening 350 and is in the shape of a female hex socket. Alternatively, the material, construction and/or the shape of the first member 332 may be other than illustrated if so desired.

In the illustrated embodiment, the second member 334 defines a bearing assembly and includes an inner bearing race 352, a plurality of balls 354, and an outer bearing race 356. The inner bearing race 352 is disposed about the outer bearing surface 344 of the first member 332. In the illustrated embodiment, the bearing assembly 334 is retained on the first member 332 between the shoulder 342A of the first flange 342 and the shoulder 346A of the second flange 346 provided on the first member 332. The second flange 346 can be made by any suitable methods, such as for example, by a swaging process.

The second member 334 also preferably includes a rubber seal 358 disposed therein on the “exterior” side (left side in FIG. 3) of the bearing assembly 334 to prevent water, dirt or other contaminants from passing through the balls 354 of the bearing assembly 334 and into an interior chamber of a housing of an associated rack and pinion steering apparatus. In the illustrated embodiment, a groove 356A is provided in the outer race 356 for receiving a seal 359. Alternatively, the construction of the second member 334 may be other than illustrated if so desired. For example, the second member 334 may be other kinds of bearings, such as for example, needle or roller bearings. Also, the retention of the second member 334 on the first member 332 may be other than illustrated if so desired.

Figure 4:
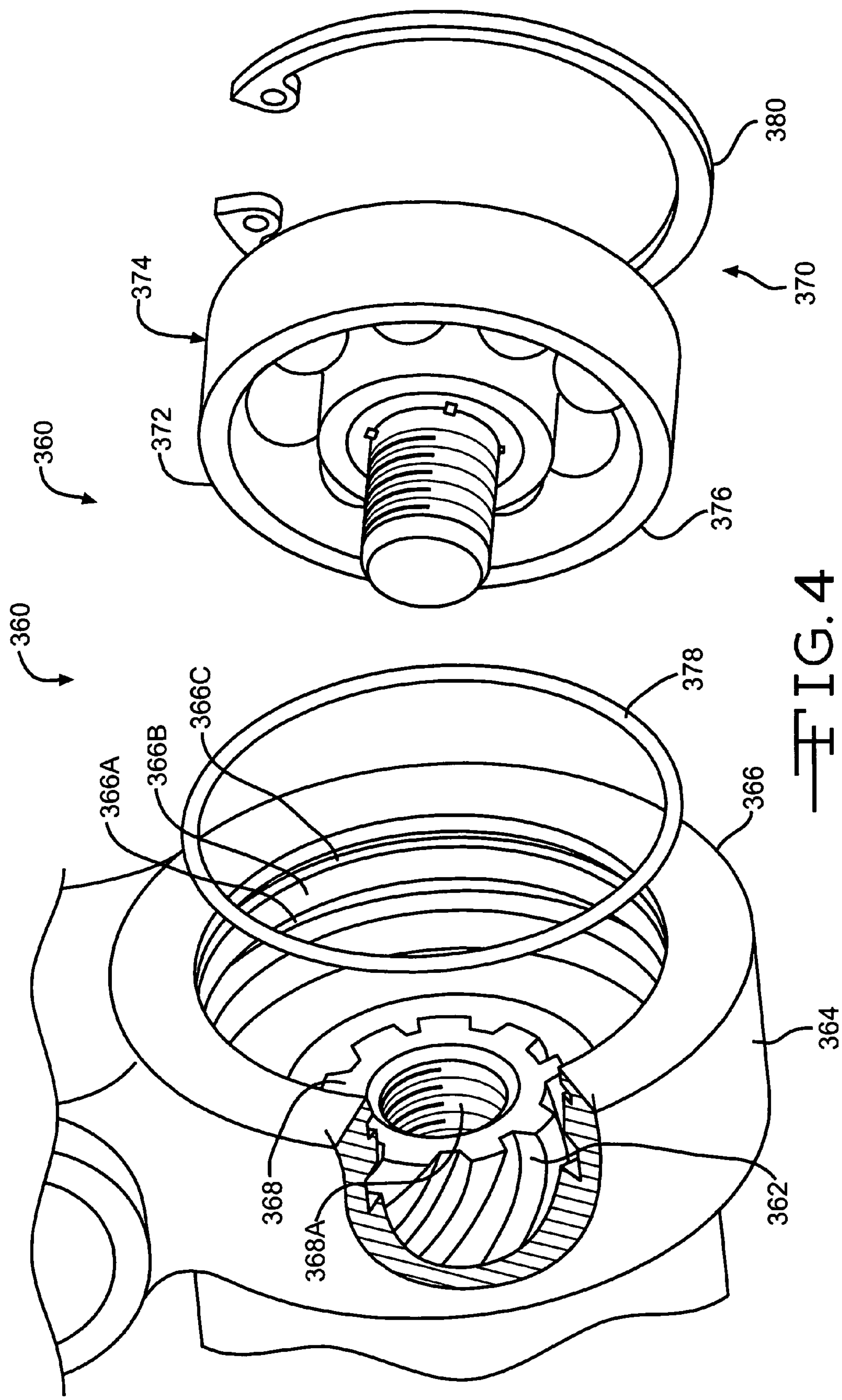
FIG. 4 is a view of a portion of a rack and pinion steering apparatus including a third embodiment of a steering gear pinion bearing assembly.

Turning now to FIG. 4 there is illustrated a portion of a rack and pinion steering apparatus, indicated generally at 360, including a third embodiment of a steering gear pinion bearing assembly, indicated generally at 370. As shown therein, the steering apparatus 360 includes a pinion gear, partially shown at 362 disposed within a housing, partially shown at 364. The housing 364 includes an end 366 having a first groove or recess 366A, a cylindrical inner surface 366B and a second groove or recess 366C formed therein. The pinion gear 362 includes an end 368 having an internally threaded portion 368A.

The steering gear pinion bearing assembly 370 includes a first or inner member 372 and a second or outer member 374. The first member 372 is formed from a suitable material, such as for example steel, and in the illustrated embodiment includes a threaded portion 376 which is adapted to be threadably received within the threaded portion 368A of the pinion gear 362. The second member 374 defines a bearing assembly and is retained on or secured to the first member 372 by suitable means. Alternatively, the material or construction of one or both of the first member 372 and/or the second member 374 may be other than illustrated if so desired.

The steering apparatus 360 further includes a seal 378 and a retaining ring 380. The seal 378 is disposed in the groove 366A of the housing 364 and engages an outer surface of the bearing assembly 374 to provide a seal therebetween. The retaining ring 380 is disposed in the groove 366B of the housing 364 is operative to ensure the retention of the steering gear pinion bearing assembly 370 therein. Alternatively, the construction of the steering gear pinion bearing assembly 370 may be other than illustrated if so desired.

Figure 5:
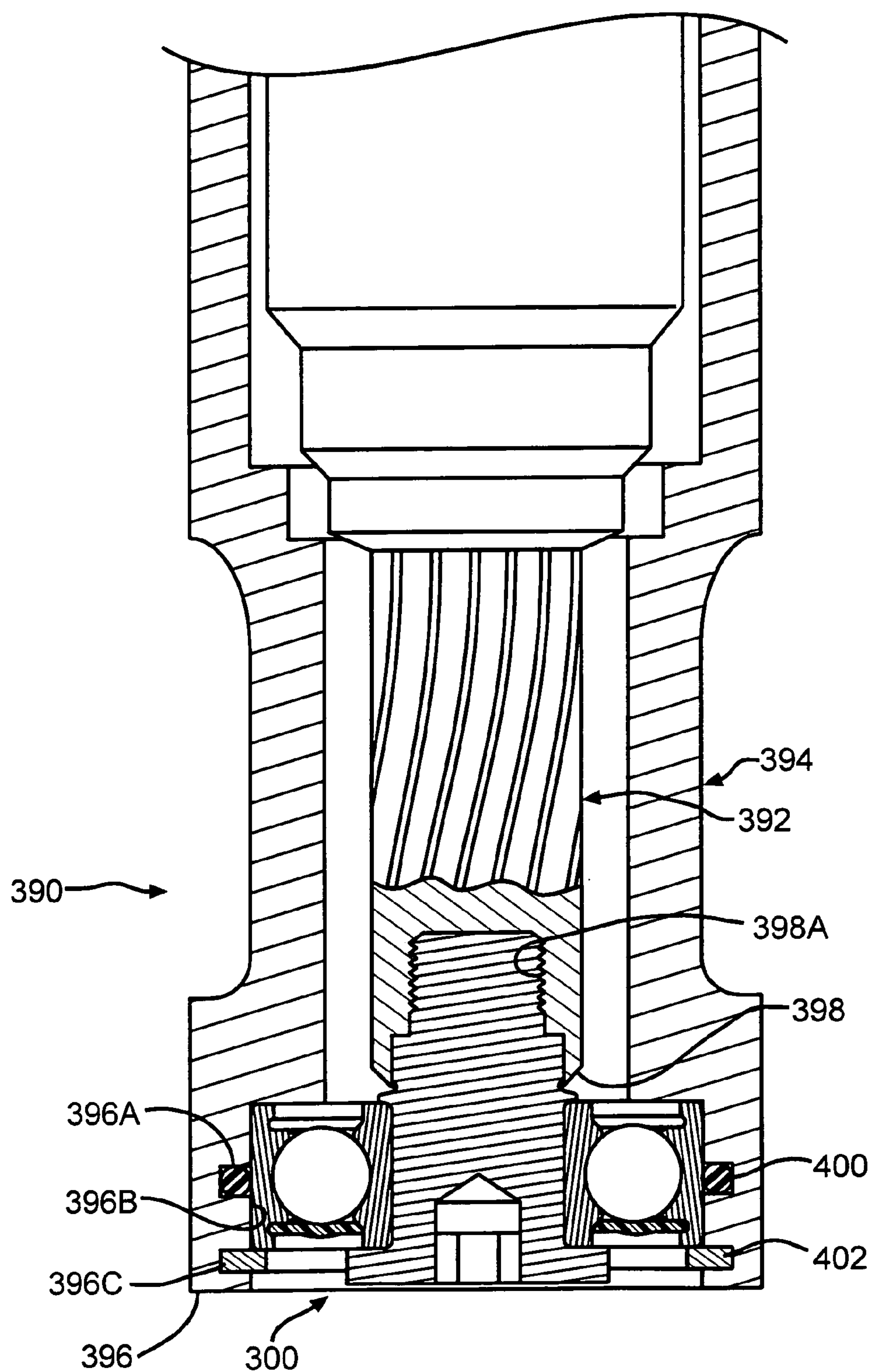
FIG. 5 is a sectional view of a portion of a rack and pinion steering apparatus including a fourth embodiment of a steering gear pinion bearing assembly, generally similar to that illustrated in FIG. 3.

Turning now to FIG. 5, there is illustrated a portion of a rack and pinion steering apparatus, indicated generally at 390, including a fourth embodiment of a steering gear pinion bearing assembly 330' installed therein. The steering gear pinion bearing assembly 330' shown in this embodiment is generally similar to the steering gear pinion bearing assembly 330 shown in FIG. 4 except that in this embodiment a reduced diameter portion 348' of the stepped body portion is provided with external threads 348A'. As shown therein, the steering apparatus 390 includes a pinion gear, partially shown at 392 disposed within a housing, partially shown at 394. The housing 394 includes an end 396 having a first groove or recess 396A, a cylindrical inner surface 396B and a second groove or recess 396C formed therein. The pinion gear 392 includes an end 398 having an internally threaded portion 398A.

The steering apparatus 390 further includes a seal 400 and a retaining ring 402. The seal 400 is disposed in the groove 396A of the housing 394 and engages an outer surface of the bearing assembly 316 to provide a seal therebetween. The retaining ring 402 is disposed in the groove 396B of the housing 394 is operative to ensure the retention of the steering gear pinion bearing assembly 330' therein. Also, in this embodiment and the other embodiments illustrated hereinbefore, it may be desirable to apply a suitable adhesive (not shown) to the associated threaded or non-threaded portion of the first member which is disposed in the respective threaded or non-threaded end of the associated pinion gear. Such a suitable adhesive may be a microencapsulated type of adhesive or any other available suitable adhesives which are operative to assist in securing the associated threaded or non-threaded portion of the first member in the respective threaded or non-threaded end of the associated pinion gear.

One advantage of the steering gear pinion bearing assembly embodiments disclosed herein is that the assembly provides a one-piece pinion bearing assembly which may be lubricated and sealed-for-life. As discussed above, the prior art rack and pinion steering apparatus required separate components, namely the pinion bearing and the pinion nut. As a result of this, the embodiments of the steering gear pinion bearing assemblies illustrated and described herein may help in reducing part complexity and manufacturing cost, reducing assembly time, and improving part performance and life. Also, the prior art rack and pinion steering apparatus required a threaded pinion plug. As a result of this, the prior art housing required sufficient material thickness to provide internal threads on the housing to accommodate the external threads of the pinion plug. The steering gear pinion bearing assembly embodiments disclosed herein utilize a retaining ring which is non-threaded. As a result of this, the thickness of the housing and the processing of the housing can be reduced thereby resulting in possible material and/or manufacturing cost savings.

In accordance with the provisions of the patent statutes, the principle and mode of operation of this invention have been explained and illustrated in its various embodiments. However, it must be understood that this invention may be practiced otherwise than as specifically explained and illustrated without departing from its spirit or scope.

What is claimed is:

1. A steering gear pinion bearing assembly adapted to support a pinion in a rack and pinion steering apparatus comprising:

a separate pinion support member operatively coupled to an end of the pinion of the rack and pinion steering apparatus, the pinion support member including a first end, a second end and a stepped body portion; and a bearing assembly carried by the pinion support member directly adjacent the end of the pinion which is operatively coupled to the pinion support member, the bearing assembly including at least a plurality of balls and an outer race.

2. The steering gear pinion bearing assembly of claim 1 wherein the stepped body portion of the pinion support member defines an inner race of the bearing assembly.

3. The steering gear pinion bearing assembly of claim 1 wherein the bearing assembly includes a separate inner race which is carried by the stepped body portion of the pinion support member.

4. The steering gear pinion bearing assembly of claim 1 wherein the pinion support member includes a portion adjacent the second end provided with external threads.

5. The steering gear pinion bearing assembly of claim 1 wherein the pinion support member includes a portion adjacent the second end provided with a smooth outer surface.

6. The steering gear pinion bearing assembly of claim 1 wherein the pinion support member includes an increased diameter flange adjacent the first end and a reduced diameter portion adjacent the second end.

7. The steering gear pinion bearing assembly of claim 1 wherein the pinion support member includes a socket opening formed in the first end and extending into the stepped body portion.

8. The steering gear pinion bearing assembly of claim 1 wherein the outer race includes a groove formed therein, and wherein a seal is disposed in the groove.

9. A steering gear pinion bearing assembly adapted to support a pinion in a rack and pinion steering apparatus comprising:

a separate pinion support member operatively coupled to an end of the pinion of the rack and pinion steering apparatus, the pinion support member including a first end, a second end and a stepped body portion; and a bearing assembly carried by the pinion support member directly adjacent the end of the pinion which is operatively coupled to the pinion support member, the bearing assembly including at least a plurality of balls and an outer race;

wherein the pinion support member includes an increased diameter flange adjacent the first end, a reduced diameter portion adjacent the second end, and a portion adjacent the second end provided with external threads.

10. The steering gear pinion bearing assembly of claim 9 wherein the stepped body portion of the pinion support member defines an inner race of the bearing assembly.

11. The steering gear pinion bearing assembly of claim 9 wherein the bearing assembly includes an inner race carried by the stepped body portion of the pinion support member.

12. The steering gear pinion bearing assembly of claim 9 wherein the pinion support member includes a socket opening formed in the first end and extending into the stepped body portion.

13. A rack and pinion steering apparatus comprising:

a housing;

a pinion gear mounted in the housing;

a pinion bearing assembly including a separate pinion support member and a bearing assembly carried by the pinion support member, the pinion support member including a first end, a second end operatively connected to an end the pinion gear, and a stepped body portion, the bearing assembly including at least a plurality of balls and an outer race; and a retaining member disposed in the housing adjacent the pinion bearing assembly.

14. The rack and pinion steering apparatus of claim 13 further including a seal disposed between an inner surface of the housing and the outer race of the bearing assembly.

15. The rack and pinion steering apparatus of claim 13 wherein the stepped body portion of the pinion support member defines an inner race of the bearing assembly.

16. The rack and pinion steering apparatus of claim 13 wherein the bearing assembly includes a separate inner race which is carried by the stepped body portion of the pinion support member.

17. The rack and pinion steering apparatus of claim 13 wherein the pinion support member includes a portion adjacent the second end provided with external threads which are threadably received in an internally threaded portion of the pinion gear to thereby secure the pinion support member to the pinion gear.

18. The rack and pinion steering apparatus of claim 13 wherein the pinion support member includes a portion adjacent the second end provided with a smooth outer surface which is received in an opening provided in the pinion gear in an interference fit to thereby secure the pinion support member to the pinion gear.

19. The rack and pinion steering apparatus of claim 13 wherein the pinion support member includes an increased diameter flange adjacent the first end and a reduced diameter portion adjacent the second end.

20. The rack and pinion steering apparatus of claim 13 wherein the pinion support member includes a socket opening formed in the first end and extending into the stepped body portion.

* * * * *